United States Patent [19]
Sharifian et al.

[11] Patent Number: 5,843,318
[45] Date of Patent: *Dec. 1, 1998

[54] METHODS OF PURIFYING HYDROXLAMINE SOLUTIONS AND SEPARATING HYDROXYLAMINE FROM HYDROXLAMINE SALTS

[75] Inventors: Hossein Sharifian, Austin, Tex.; Christopher D. Shay, Stillwater, Okla.

[73] Assignee: Sachem, Inc., Austin, Tex.

[*] Notice: The term of this patent shall not extend beyond the expiration date of Pat. No. 5,709,789.

[21] Appl. No.: 837,221

[22] Filed: Apr. 10, 1997

[51] Int. Cl.$^6$ .................................................. B01D 1/00
[52] U.S. Cl. ............................ 210/652; 210/651; 210/650
[58] Field of Search .................................. 210/650, 651, 210/652, 653, 654, 655

[56] References Cited

U.S. PATENT DOCUMENTS

| | | | |
|---|---|---|---|
| 4,321,313 | 3/1982 | Langer et al. | 429/13 |
| 4,645,579 | 2/1987 | Weiss et al. | 204/182.4 |
| 4,818,353 | 4/1989 | Langer et al. | 204/74 |
| 4,849,073 | 7/1989 | Dotson et al. | 204/101 |
| 4,851,125 | 7/1989 | Dotson et al. | 210/651 |
| 4,968,394 | 11/1990 | Dotson et al. | 204/101 |
| 5,281,311 | 1/1994 | Sharifian et al. | 204/101 |
| 5,318,762 | 6/1994 | Cawlfield et al. | 423/387 |
| 5,447,610 | 9/1995 | Sharifian | 204/101 |
| 5,709,789 | 1/1998 | Shay et al. | 204/537 |

FOREIGN PATENT DOCUMENTS 2602802   8/1987   France.

OTHER PUBLICATIONS

Bathia et al., "Hydroxylamine Production by Electroreduction of a Nitric Oxide in a Trickle Bed Cell", *The Canadian Journal of Chemical Engineering*, vol. 57, No. 5, pp. 631–637, 1979.

Colucci et al., "The Electro Reduction of Nitric Oxide on Bulk Platinum in Acid Solutions", *Electrochimica Acta*, vol. 4, pp. 521–528, 1985.

*Primary Examiner*—Ana Fortuna
*Attorney, Agent, or Firm*—Renner, Otto, Boisselle & Sklar

[57] ABSTRACT

The present invention provides a method of purifying a hydroxylamine solution containing impurities, including contacting the hydroxylamine solution with a semipermeable membrane under pressure so that at least a portion of the hydroxylamine solution passes through the membrane; and recovering the portion of the hydroxylamine solution which passed through the membrane.

23 Claims, 7 Drawing Sheets

| | TDS(% wt.) | HA(mol/L) | HAN(mol/L) |
|---|---|---|---|
| ▼ | 3.8 | .461 | .283 |
| ▽ | 4.6 | .563 | .337 |
| ● | 6.2 | .784 | .446 |
| ○ | 15.4 | 1.964 | 1.085 |

○ TFCL-HP
● BW30
▼ MS10
▽ SW30-HR

METHODS OF PURIFYING HYDROXLAMINE SOLUTIONS AND SEPARATING HYDROXYLAMINE FROM HYDROXLAMINE SALTS

TECHNICAL FIELD

The present invention relates to purifying hydroxylamine solutions and separating hydroxylamine from hydroxylammonium salts using a semipermeable membrane.

BACKGROUND OF THE INVENTION

Hydroxylamine and hydroxylammonium salts are compounds which have a variety of applications. For instance, hydroxylammonium nitrate may be used as a component of liquid propellant and as a reducing agent in photographic operations. In some of these applications, it is desirable that a hydroxylammonium salt solution of high purity be available.

Hydroxylamine is useful as an intermediary in chemical processes especially in the pharmaceutical and agricultural industries. It is also useful in stripper formulations. Stripper formulations may be used to remove photoresists from or clean a substrate. For example, hydroxylamine stripper solutions are used to remove polyimide coatings from metal foils. Hydroxylamine stripper solutions are extensively utilized in the printed circuit board and semiconductor industries. Frequently, solutions of hydroxylamine, especially solutions prepared from hydroxylammonium salts, contain undesirable amounts of impurities such as salts, acids, metals and unwanted organic materials. Thus, there also exists a need for hydroxylamine solutions having high purity.

There exist several production methods to manufacture hydroxylamine and hydroxylammonium salts. Some of these methods, however, do not provide hydroxylamine solutions or hydroxylammonium salt solutions of high purity which some applications of the compounds require. Consequently, there remains a substantial demand for large quantities of high purity hydroxylamine solutions and hydroxylammonium salt solutions.

SUMMARY OF THE INVENTION

In one embodiment, the present invention relates to a method of purifying a hydroxylamine solution containing impurities, including the steps of contacting the hydroxylamine solution with a semipermeable membrane under pressure so that at least a portion of the hydroxylamine solution passes through the membrane; and recovering the portion of the hydroxylamine solution which passed through the membrane.

In another embodiment, the present invention relates to a method of separating hydroxylamine from hydroxylammonium salt in a solution containing hydroxylamine and a hydroxylammonium salt, including the steps of passing at least a portion of the solution containing hydroxylamine and the hydroxylammonium salt at a first concentration through a semipermeable membrane under pressure; and collecting the portion of solution which passed through the membrane, the portion containing hydroxylamine and the hydroxylammonium salt at a second concentration, wherein the second concentration is less than the first concentration.

In yet another embodiment, the present invention relates to a method of preparing hydroxylamine, involving the steps of providing an electrochemical cell containing an anode, a cathode, a bipolar membrane positioned between the anode and the cathode, the bipolar membrane having an anion selective side facing the anode and a cation selective side facing the cathode, and a divider positioned between the bipolar membrane and the anode, thereby defining a feed compartment on the cation selective side of the bipolar membrane, a recovery compartment on the anion selective side of the bipolar membrane, and an anolyte compartment between the divider and the anode; charging the feed compartment with an acidic electrolyte and the recovery and anolyte compartments with a solution; introducing a nitrogen containing compound into the feed compartment; passing a current through the electrochemical cell thereby producing hydroxylammonium salt in the feed compartment; transferring at least a portion of the hydroxylammonium salt from the feed compartment to the recovery compartment thereby producing a hydroxylamine solution in the recovery compartment; recovering the hydroxylamine solution from the recovery compartment; contacting the hydroxylamine solution with a semipermeable membrane under pressure so that at least a portion of the hydroxylamine solution passes through the membrane; and recovering hydroxylamine from the portion of the hydroxylamine solution which passed through the membrane.

In still yet another embodiment, the present invention relates to a method of separating a hydroxylammonium nitrate from hydroxylamine involving the steps of providing an electrochemical cell containing an anode, a cathode including mercury, a bipolar membrane, and a divider thereby defining an anolyte compartment between the anode and the divider, a middle compartment between the bipolar membrane and the divider, and a catholyte compartment between the cathode and the bipolar membrane; charging a nitric acid solution to the catholyte compartment and dilute nitric acid to the middle compartment and anolyte compartment; applying a current to the cell; transferring solution from the catholyte compartment to the middle compartment; recovering a solution containing hydroxylammonium nitrate and hydroxylamine from the middle compartment; contacting the solution from the middle compartment with a semipermeable membrane under pressure so that at least a portion of the solution passes through the membrane; and recovering hydroxylamine from the portion of the solution which passed through the membrane.

DESCRIPTION OF PREFERRED EMBODIMENTS

The term "hydrocarbyl" is used herein to include substantially hydrocarbyl groups as well as purely hydrocarbyl groups. The description of these groups as being substantially hydrocarbyl means that they contain no non-hydrocarbyl substituents or non-carbon atoms which significantly affect the hydrocarbyl characteristics or properties of such groups relevant to their uses as described herein. Examples of hydrocarbyl substituents which may be useful in connection with the present invention include alkyl, alkenyl, alicyclic and aromatic substituents.

Hydroxylamine may be represented by the formula $$(NR^1R^2OH)$$

wherein $R^1$ and $R^2$ are independently hydrogen or hydrocarbyl containing 1 to about 6 carbon atoms, and preferably independently hydrogen or hydrocarbyl containing 1 to about 3 carbon atoms.

Hydroxylammonium salts may be represented by the formula $$(NHR^1R^2OH)^+_y X^{-y}$$

wherein $R^1$ and $R^2$ are independently hydrogen or hydrocarbyl containing 1 to about 6 carbon atoms, and preferably independently hydrogen or hydrocarbyl containing 1 to about 3 carbon atoms, X is an anion of an acid or salt, and y is a number equal to the valence of X. Specific examples of anions include $Cl^-$, $Br^-$, $SO_4^{-2}$, $HSO_4^-$, $PO_4^{-3}$, $H_2PO_4^{-1}$, $HPO_4^{-2}$, $NO_3^-$, $HCO_3^-$, $CO_3^{-2}$, $ClO^-$, $H_2CO_2^-$, $CH_3CO_2^-$, $CH_3CH_2CO_2^-$, etc. Specific examples of $R^1$ and $R^2$ include hydrogen, methyl, ethyl, propyl including isopropyl, butyl, etc. In embodiments where at least one of $R^1$ and $R^2$ are hydrocarbyl, the hydroxylamine may be an organic hydroxylamine. Hydroxylammonium salts also include corresponding hydroxylamine compounds such as hydroxylamine hydrochlorides, hydroxylamine sulfates, hydroxylamine phosphates and so on.

Specific examples of inorganic acids, represented by formula $H_yX$, which may provide the anion of a hydroxylammonium salt include nitric acid, halogen acids such as hydrofluoric acid, hydrochloric acid, hydrobromic acid and hydriodic acid, sulfuric acid, sulfurous acid, perchloric acid, boric acid and phosphorus acids such as phosphorous acid and phosphoric acid. Nitric acid and sulfuric acid are preferred inorganic acids. Examples of organic acids represented by the formula $H_yX$ which may provide the anion of a hydroxylammonium salt include carboxylic and polycarboxylic acids such as formic acid, acetic acid, propionic acid, citric acid, oxalic acid, etc.; organic phosphorus acids such as dimethylphosphoric acid and dimethylphosphinic acid; or sulfonic acids such as methanesulfonic acid, ethanesulfonic acid, 1-pentanesulfonic acid, 1-hexanesulfonic acid, 1-heptanesulfonic acid, benzenesulfonic acid, toluenesulfonic acid, etc.

Specific examples of hydroxylammonium salts include hydroxylammonium sulfate, hydroxylammonium nitrate, hydroxylammonium carbonate, hydroxylammonium hydrochloride, hydroxylammonium fluoride, hydroxylammonium formate, hydroxylammonium acetate, hydroxylammonium phosphate, hydroxylammonium methylsulfonate, hydroxylammonium toluene sulfonate, etc.

Examples of organic hydroxylammonium salts include methylhydroxylammonium salts, ethylhydroxylammonium salts, propylhydroxylammonium salts, isopropylhydroxylammonium salts, and diethylhydroxylammonium salts. Specific embodiments of organic hydroxylammonium salts include methylhydroxylamine hydrochloride, ethylhydroxylamine hydrochloride, propylhydroxylamine hydrochloride, isopropylhydroxylamine hydrochloride, and diethylhydroxylamine hydrochloride and other corresponding salts.

Various methods of providing hydroxylamine and/or hydroxylammonium salts are described in U.S. Pat. Nos. 4,321,313; 4,645,579; 4,849,073; 4,968,394; 5,281,311 and 5,447,610; French Patent 2,602,802; and a number of publications listed below all of which are hereby incorporated by reference for their relevant disclosure. French Patent 2,602,802 is directed to an electrolytic process to directly produce solutions of hydroxylammonium nitrate from nitric acid. U.S. Pat. No. 4,645,579 relates to aqueous solutions of hydroxylamine which are prepared from aqueous hydroxylammonium salt solutions by electrodialysis. U.S. Pat. No. 4,849,073 relates to electrolytically producing hydroxylamine nitrate from aqueous nitric acid using a mercury cathode. U.S. Pat. No. 5,281,311 relates to an electrolytic process for making hydroxylamine or hydroxylamine salt solutions. U.S. Pat. No. 5,447,610 relates to preparing hydroxylamine and hydroxylammonium salts by electrolytically reducing a mixture containing at least one nitrogen oxide and either a neutral electrolyte to form hydroxylamine or an acidic electrolyte such as an organic or inorganic acid to form a hydroxylammonium salt. The production of hydroxylamine by the electroreduction of nitric oxide in sulfuric acid is described by L. J. J. Janssen et al in *Electrochimica Acta*, 1977, Vol. 22, pp. 27–30 and by M. L. Bathia et al in *The Canadian Journal of Chemical Engineering*, Vol. 57, October 1979, pp. 631-7. Janssen et al utilize a platinum cathode, and Bathia et al utilize a cathode bed of tungsten carbide particles. The electroreduction of nitric oxide on bulk platinum in perchloric acid and sulfuric acid solutions is described by J. A. Colucci et al in *Electrochimica Acta*, Vol. 30, No. 4, pp. 521–528, 1985. In the case of hydroxylammonium nitrate for example, some of these methods include: electrodialysis of hydroxylammonium chloride and nitrate; reaction of hydroxylammonium sulfate and barium nitrate; three-step cation exchange process employing hydroxylammonium sulfate and nitric acid; and electrolytic reduction of nitric acid.

In one embodiment, the present invention provides a method of purifying a hydroxylamine solution containing impurities. The amount of hydroxylamine in solution may be from about 0.1% (by weight) to about 50%, and preferably from about 0.5% to about 25%, and more preferably from about 1.5% to about 10%. In another embodiment, the impurities in a hydroxylamine solution include hydroxylammonium salts. The amount of hydroxylammonium salt in the hydroxylamine solution may be from about 0.1% (by weight) to about 60%, and preferably from about 0.5% to about 30%, and more preferably from about 1% to about 5%. Other impurities include unwanted organic materials and metal ions (alkali metals, alkaline earth metals and transition metals). In another embodiment, the present invention provides a method of separating hydroxylamine from hydroxylammonium salts.

The hydroxylamine solution may also contain a stabilizer for the hydroxylamine because hydroxylamine tends to decompose in solution in some instances. In one embodiment, the hydroxylamine solution contains at least two stabilizers. Examples of stabilizers include quinoline derivatives, thiocarboxylic acids, thiosulfates, flavones, hydroxyanthraquinones, anthocyanidines, etc. Specific examples include 8-hydroxyquinoline, morin hydrate, cyanidinium chloride, quinalizarine, benzonitrile, benzamidoxime, isocyanates, N-phenyl-N-hydroxythiourea, 2,3-didehydrohexono-1,4-lactone, alkali metal salts of ethylenediaminetetraacetic acid, and quercetin. The amount of stabilizer in the solution may range from about $5 \times 10^{-4}\%$ to about 1% by weight of the solution.

The hydroxylamine solution may also contain impurities including nitrogen containing compounds such as nitrogen containing gas and ionic compounds useful as electrolytes. Examples of nitrogen containing gas include nitrogen oxide gas and nitrogen-hydrogen gas. Nitrogen oxide gas as used herein is intended to mean a gas containing nitrogen and oxygen atoms. Examples of nitrogen oxide gas include one or more of nitric oxide (NO), nitrogen dioxide ($NO_2$), nitrogen trioxide ($NO_3$), dinitrogen trioxide ($N_2O_3$), dinitrogen pentoxide $N_2O_5$.

Examples of ionic compounds include salts, metal salts or any compound which forms an anion and cation when dissolved in water or an organic solution. Typical acids include inorganic acids such as nitric acid, halogen acids such as hydrofluoric acid, hydrochloric acid, hydrobromic acid and hydriodic acid, sulfuric acid, sulfurous acid, perchloric acid, boric acid and phosphorus acids such as phosphorous acid and phosphoric acid and organic acids including carboxylic and polycarboxylic acids such as formic acid, acetic acid, propionic acid, citric acid, oxalic acid, etc.; organic phosphorus acids such as dimethylphosphoric acid and dimethylphosphinic acid; or sulfonic acids such as methanesulfonic acid, ethanesulfonic acid, 1-pentanesulfonic acid, 1-hexanesulfonic acid, 1-heptanesulfonic acid, benzenesulfonic acid, and toluenesulfonic acid. The hydroxylamine solution may also contain impurities including unwanted organic materials such as large molecular weight organic materials such as photoresists, ionic materials or particulate matter.

The hydroxylamine solution, and any other solution described herein, may be aqueous or organic based, or mixtures thereof. In embodiments where the solution is aqueous, it is preferable to use deionized water, although tap water may be used. Organic solutions include alcohols, glycols, and other polar organic liquids.

The hydroxylamine solution is contacted with a semipermeable membrane under pressure so that at least a portion of the hydroxylamine solution passes through the membrane. The pressure causes the liquid hydroxylamine to pass through the membrane. However, impurities, such as hydroxylammonium salts, do not pass through the membrane. Permeability is based upon at least one of molecular weight, molecular size, molecular branching, polarity, degree of dissociation of ionizable compounds and solubility. In one embodiment, the semipermeable membrane is a size selective semipermeable membrane. In a preferred embodiment, the semipermeable membrane is a reverse osmosis membrane in a reverse osmosis unit.

The pressure applied generally varies depending upon the specific identity of the semipermeable membrane and the contents (and amounts of components) of the hydroxylamine solution. In one embodiment, the pressure is from about 100 psi to about 1,500 psi, preferably from about 300 psi to about 1,000 psi, more preferably from about 500 psi to about 900 psi, and most preferably above about 700 psi. Higher pressures are generally preferred.

The flow rate, which is the rate at which solution is contacted with the semipermeable membrane, employed generally varies depending upon the specific identity of the semipermeable membrane, the contents (and amounts of components) of the hydroxylamine solution, and the pressure applied. In one embodiment, the flow rate is from about 100 ml/min to about 2,000 ml/min, preferably from about 300 ml/min to about 1,300 ml/min, and more preferably from about 500 ml/min to about 1,000 ml/min.

During the inventive method, it is generally desirable that the temperature of the solutions be maintained within the range of from about 1° C. to about 70° C., preferably from about 10° C. to about 40° C., and particularly the temperature is maintained at about 20° C. to about 35° C.

Also during the inventive method, it is generally desirable that the pH of the solutions be maintained within certain ranges. Since the pH of the solutions changes over the course of practicing the present invention, and since the pH of the individual solutions on opposite sides of the semipermeable membrane may be different, the following parameters are provided as a general guide. In the portion which does not pass through the semipermeable membrane, the pH range may be from about 0 to about 14, and preferably from about 1 to about 13. In the portion which passes through the semipermeable membrane, the pH range may be from about 7 to about 14, and preferably from about 8 to about 13.

Reverse osmosis membranes are available from Fluid Systems, FilmTec, Osmonics, Inc., Desalination Systems Inc., Toray, DuPont, Nitto-Denko and others. Specific examples of reverse osmosis membranes suitable for use in the present invention include TFCL-HP thin film composite membrane from Fluid Systems; SE, SG and SC from Desalination Systems Inc.; SW30-HP and BW30 from FilmTec; and MS10 from Osmonics, Inc. Reverse osmosis membranes generally permit solutions such as water and small molecular weight organics (such as hydroxylamine) to pass through while not permitting ionic compounds to pass.

The portion of the hydroxylamine solution which passes through the semipermeable membrane is recovered. The hydroxylamine solution which passes through the membrane contains at least one of a relatively higher ratio of hydroxylamine to impurities such as hydroxylammonium salts than the hydroxylamine solution contacted with the membrane, a higher concentration of hydroxylamine than the hydroxylamine solution contacted with the membrane, and a lower concentration of hydroxylammonium salt than the hydroxylamine solution contacted with the membrane. Most impurities, such as hydroxylammonium salts, ionic materials and large molecular weight organic compounds do not pass through the semipermeable membrane.

The rate at which solution passes through the membrane may be defined as permeate flux. The permeate flux depends upon a number of factors including at least one of the specific identity of the semipermeable membrane, the contents (and amounts of components) of the hydroxylamine solution, and the pressure applied. In one embodiment, the permeate flux is from about 1 ml/min/12.6 $in^2$ membrane surface area to about 40 ml/min/12.6 $in^2$ membrane surface area, preferably from about 2 ml/min/12.6 $in^2$ membrane surface area to about 30 ml/min/12.6 $in^2$ membrane surface area, and more preferably from about 3 ml/min/2.6 $in^2$ membrane surface area to about 20 ml/min/12.6 $in^2$ membrane surface area.

The concentration of hydroxylamine in the hydroxylamine solution which passed through the membrane may be from about 0.1% (by weight) to about 50%, and preferably from about 0.5% to about 25%, and more preferably from about 1.5% to about 10%. The amount of hydroxylammonium salt in the hydroxylamine solution which passed through the membrane may be less than about 10% (by weight), and preferably less than about 5%, and more preferably less than about 0.1%, and in some instances, 0%.

When the hydroxylamine solution which passed through the membrane contains a lower concentration of hydroxylammonium salt than the hydroxylamine solution contacted with the membrane, the ratio of the amount of hydroxylammonium salt which does not pass through the membrane compared to the amount of hydroxylammonium salt in the solution contacted with the membrane is described as the percent rejected. In one embodiment, the percent rejection of hydroxylammonium salt is greater than about 50%, preferably greater than about 75%, and more preferably greater than about 90%. In most embodiments, ammonium ions are rejected; that is, they do not pass through the membrane as solution is contacted with the membrane. In these embodiments, the percent rejection of ammonium ions is greater than about 50%, preferably greater than about 75%, and more preferably greater than about 90%. It is a significant and unexpected advantage to separate hydroxylamine from hydroxylammonium ions using the methods of the present invention.

The hydroxylamine solution which passed through the membrane may be contacted with the membrane one or more times thereby markedly enhancing the percent rejection of hydroxylammonium salt from the original hydroxylamine solution. In a preferred embodiment, the hydroxylamine solution is passed through the membrane at least two times. The inventive method can be practiced batchwise or in a continuous operation.

For example, the hydroxylamine solution obtained from the recovery compartment containing hydroxylammonium salts is sent through a reverse osmosis membrane (for instance, polyamide, polysulfone, polyurea, or cellulose acetate based membrane) under high pressure (over 100 and often over 500 psi). Most of the hydroxylamine passes through the membrane whereas most of the hydroxylammonium salts and ammonium ions do not.

In one embodiment of the invention, the process for purifying hydroxylamine involves electrochemically reducing a nitrogen compound such as nitrogen oxide gas in the presence of an acidic electrolyte to form a hydroxylammonium salt. The electrochemical cell used in this embodiment contains an anode, a cathode, a bipolar membrane and a divider. In an embodiment where only hydroxylammonium salts are produced, the divider may be omitted. In a general sense, the cells may be composed of cell materials which are compatible with the materials being charged into the cells. The cell materials must be particularly able to tolerate a mildly acidic or basic environment. A feed compartment is located between the cathode and the bipolar membrane, a recovery compartment is located between the bipolar membrane and the divider, and an anolyte compartment is located between the divider and the anode. When only hydroxylammonium salts are produced, the electrochemical cell does not contain a divider or a recovery compartment, and the anolyte compartment is located between the bipolar membrane and the anode.

The cells may be adapted to operate at atmospheric pressure or at elevated pressures. The cathode comprises a material which exhibits electrocatalytic activity for nitrogen oxide reduction to hydroxylamine or hydroxylammonium salts. The cathode is generally a gas diffusion cathode.

The gas-diffusion cathode may comprise a conventional cathode structure formed of a suitable porous hydrophobic material such as polytetrafluoroethylene (PTFE), mixed with carbon black and a catalyst.

The electrochemical cell may contain a gas chamber next to the gas diffusion cathode. Nitrogen containing gas is injected into the gas chamber and then forced through the gas diffusion cathode into the feed compartment. The anolyte compartment of the electrochemical cell contains a solution of an ionic compound (a compound that fully or partially ionizes in solution). The concentration of the ionic compound in the anolyte compartment is from about 0.01M to about 5M. The feed compartment of the electrochemical cell contains nitrogen containing gas and an acidic electrolyte as described above. The choice of acid in the acidic electrolyte is determined by the particular hydroxylammonium salt desired to be produced. The concentration of acid in the acidic electrolyte may be from about 0.01M to about 5M. The recovery compartment of the electrochemical cell initially contains a solution of an ionic compound. The concentration of the ionic compound in the recovery compartment is from about 0.01M to about 5M.

Hydroxylammonium salt is produced in the feed compartment containing nitrogen containing gas and the acidic electrolyte by applying a current between the anode and cathode with an apparent current density of about 10 to about 500 mA/cm$^2$, more often from about 50 to about 150 mA/cm$^2$ at about 6 volts to about 12 volts. The current is applied to the electrochemical cell for a period of time effective to produce the hydroxyammonium salt in the feed compartment at a desired concentration. The electrochemical cell may be maintained at a temperature suitable for the production of hydroxylammonium salt and hydroxylamine. The temperature is from about 1° C. to about 70° C. The concentration of the hydroxylammonium salt produced in the feed compartment is from about 0.01M to about 5M, and preferably from about 2M to about 3M.

A portion of the hydroxylammonium salt may be either recovered or physically transferred to the recovery compartment. This may be accomplished on an intermittent or continuous basis by methods known to those skilled in the art. The current applied to the electrochemical cell causes anions to migrate to the anolyte compartment and produces hydroxylamine in the recovery compartment. Hydroxylamine solution may then be obtained from the recovery compartment.

Figure 7:
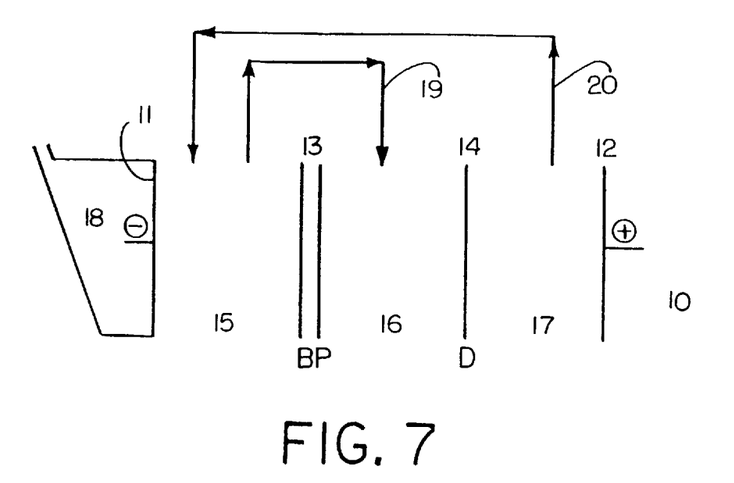
FIG. 7 is a schematic illustration of an electrochemical cell in connection with the present invention.

Referring to FIG. 7, the electrochemical cell 10 is made of a cathode 11, an anode 12, and in sequence beginning at the cathode 11, a bipolar membrane 13 and a divider 14. In a preferred embodiment, the divider 14 is an anion selective membrane. The bipolar membrane 13 has an anion selective side (not shown) facing the anode and a cation selective side (not shown) facing the cathode. The electrochemical cell 10 contains three compartments; namely, a feed compartment 15, a recovery compartment 16, and an anolyte compartment 17. The cathode 11 is a gas diffusion cathode. A gas chamber 18 is positioned next to the cathode 11.

In operation of the electrochemical cell illustrated in FIG. 7, an acidic electrolyte containing an acid and water is charged to the feed compartment 15. An aqueous solution containing an ionic compound is charged to the recovery compartment 16 and the anolyte compartment 17. The ionic compound is at a first concentration in the recovery compartment and at a second concentration in the anolyte compartment 17. The gas chamber 18 is filled with nitrogen containing gas. Under pressure, the nitrogen containing gas passes through the cathode 11 and enters the feed compartment 15. The pressure should be sufficient to force the nitrogen containing gas through the gas diffusion cathode, but not significantly greater. An electrical potential is established and maintained between the anode and the cathode to produce a flow of current across the electrochemical cell whereupon a hydroxylammonium salt is produced in the feed compartment 15. A portion of the hydroxylammonium salt is either collected or physically removed from the feed compartment 15 as shown by line 19 and transferred to the recovery compartment 16. As a result of the electrical potential maintained between the anode and the cathode, the salt (anion) of the hydroxylammonium salt is attracted towards the anode 12 thereby passing through the divider 14 into the anolyte compartment 17. Hydroxylamine is produced in the recovery compartment 16. Hydroxylamine is then recovered from the recovery compartment 16.

In a preferred embodiment, a portion of the solution in the anolyte compartment may be physically removed and transferred, as shown by line 20, to the feed compartment 15. In an even more preferred embodiment, the acid solution obtained from the anolyte compartment is concentrated before it is added to the feed compartment. As the salt anion from the hydroxylammonium salt migrates through the divider 14 into the anolyte compartment 17, an acid corresponding to the salt is produced in the anolyte compartment. Since the feed compartment 15 must contain a certain minimum concentration of acid, the acid produced in the anolyte compartment may be transferred to the feed compartment thereby recycling the acid used in the methods of the present invention thereby eliminating the need to constantly or intermittently add fresh acid to the feed compartment. As a result, substantial cost and environmental benefits are realized. In this preferred embodiment, the ionic compound charged into the recovery and anolyte compartments is the acid which is contained in the acidic electrolyte charged into the feed compartment.

As needed, various compounds such as one or more acids, water, one or more ionic compounds, nitrogen containing gas, stabilizers and the like may be added or recovered from the feed, recovery and anolyte compartments in order to maintain efficient operation of the electrochemical cell. For example, acid and nitrogen containing gas must be continuously or intermittently added to the feed compartment. From time to time, it may also be necessary to intermittently or continuously remove acid from the anolyte compartment.

A portion of the hydroxylammonium salt solution collected from the feed compartment 15 or hydroxylamine solution recovered from the recovery compartment 16 may be contacted with a semipermeable membrane under pressure so that substantially only a portion of the solution containing hydroxylamine passes through the semipermeable membrane and impurities remain in the portion which does not pass through the semipermeable solution.

Figure 8:
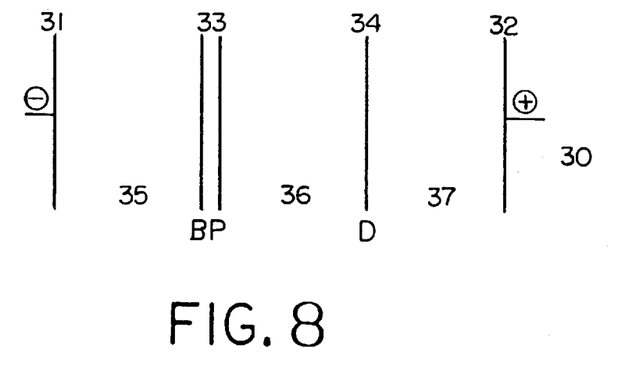
FIG. 8 is another schematic illustration of an electrochemical cell in connection with the present invention.

In another embodiment of the invention, referring to FIG. 8, the process for separating a hydroxylammonium salt such as hydroxylammonium nitrate from hydroxylamine involves providing a three compartment electrochemical cell 30 containing an anode 32, a cathode including mercury 31, a bipolar membrane 33, and a divider 34 thereby defining an anolyte compartment 37 between the anode and the divider, a middle compartment 36 between the bipolar membrane and the divider, and a catholyte compartment 35 between the cathode and the bipolar membrane. The divider is preferably an anion selective membrane. The cathode may be a mercury cathode, a mercury pool cathode, or an amalgamated nickel, copper, lead, or tin cathode. A relatively concentrated acid solution, such as at least 5M nitric acid, is charged to the catholyte compartment and less concentrated acid solution, such as 1M nitric acid, is charged to the middle and anolyte compartments. A current is applied. Solution from the catholyte compartment is transferred to the middle compartment.

Solution containing hydroxylammonium nitrate and hydroxylamine is collected from the middle compartment and contacted with a semipermeable membrane under pressure so that substantially only a portion of the solution containing hydroxylamine passes through the semipermeable membrane and impurities remain in the portion which does not pass through the semipermeable solution. Impurities may include acid, such as nitric acid and hydroxylammonium salt such as hydroxylammonium nitrate.

The following specific examples illustrate the preparation of the hydroxylammonium salts of the present invention. Unless otherwise indicated in the examples and elsewhere in the specification and claims, all parts and percentages are by weight, and temperatures are in degrees centigrade.

EXAMPLE 1

A solution of 0.5M of hydroxylamine and 0.3M of hydroxylammonium nitrate is contacted with a Fluid Systems TFCL-HP membrane having a surface area of 12.6 square inches under pressure of 900 psi in a single stainless steel cell. The permeate flux is 12.5 ml/min/ 2.6 in$^2$ membrane surface area. The portion of the solution passing through the membrane contains about 92% of the hydroxylamine and 10% of the hydroxylammonium nitrate present in the initial solution. Accordingly, the portion of the solution recovered contains 0.46M hydroxylamine and about 0.1M hydroxylammonium nitrate. The recovered solution is contacted with the membrane a second time under the same conditions. The portion of the recovered solution which passed through the membrane contains more than 90% of the hydroxylamine and about 1% of hydroxylammonium nitrate present in the initial solution.

EXAMPLE 2

The procedure of Example 1 is followed in three instances, except that three different respective membranes from Desalination System, Inc. (under the designations SE, SG, and SC) are substituted for the Fluid Systems membrane and the procedure is conducted only once. The portion of the solution passing through the SG membrane contained about 92% hydroxylamine and about 38% hydroxylammonium nitrate (62% rejection) under a pressure of 800 psi. The portion of the solution passing through the SE membrane contained about 92% hydroxylamine and about 30% hydroxylammonium nitrate (70% rejection) under a pressure of 900 psi. The portion of the solution passing through the SC membrane contained about 92% hydroxylamine and about 36% hydroxylammonium nitrate (64% rejection) under a pressure of 800 psi.

EXAMPLE 3

Figure 1:
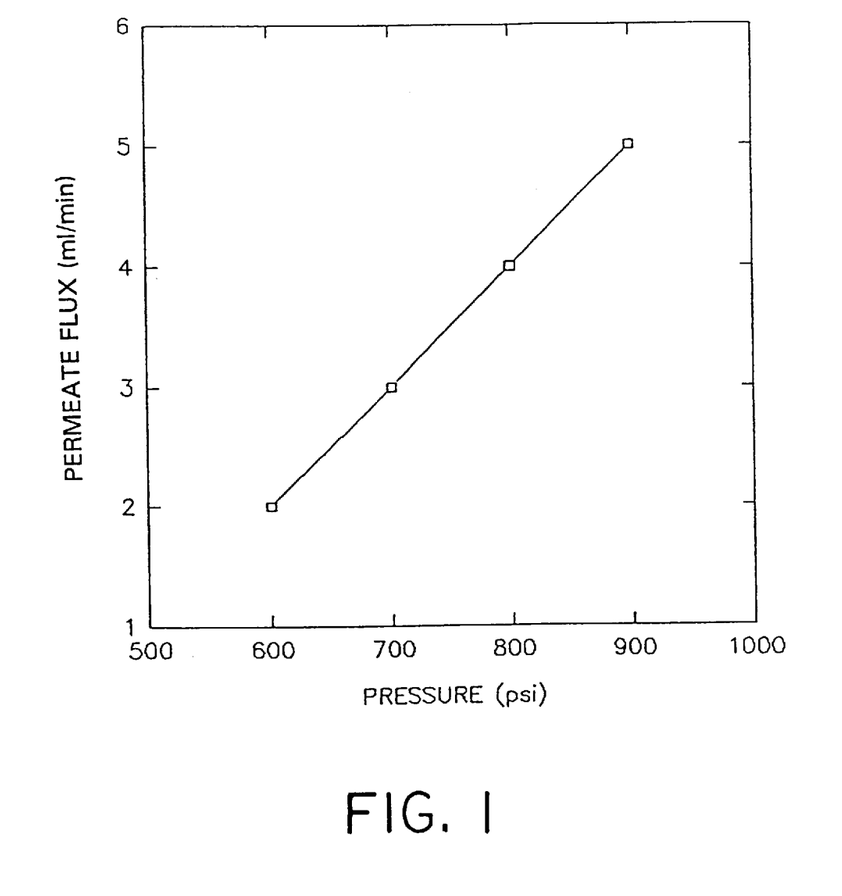
FIG. 1 is a graphical illustration reporting the relationship between permeate flux and pressure from Example 3.

A solution of 0.5M of hydroxylamine and 0.3M of hydroxylammonium nitrate is contacted with a Fluid Systems TFCL-HP membrane having a surface area of 12.6 square inches under pressure of 900 psi in a single stainless steel cell. The permeate flux is 12.5 ml/min/12.6 in$^2$ membrane surface area. The purpose of this example is to evaluate the permeate flux verses pressure. The results are shown in FIG. 1.

EXAMPLE 4

Figure 2:
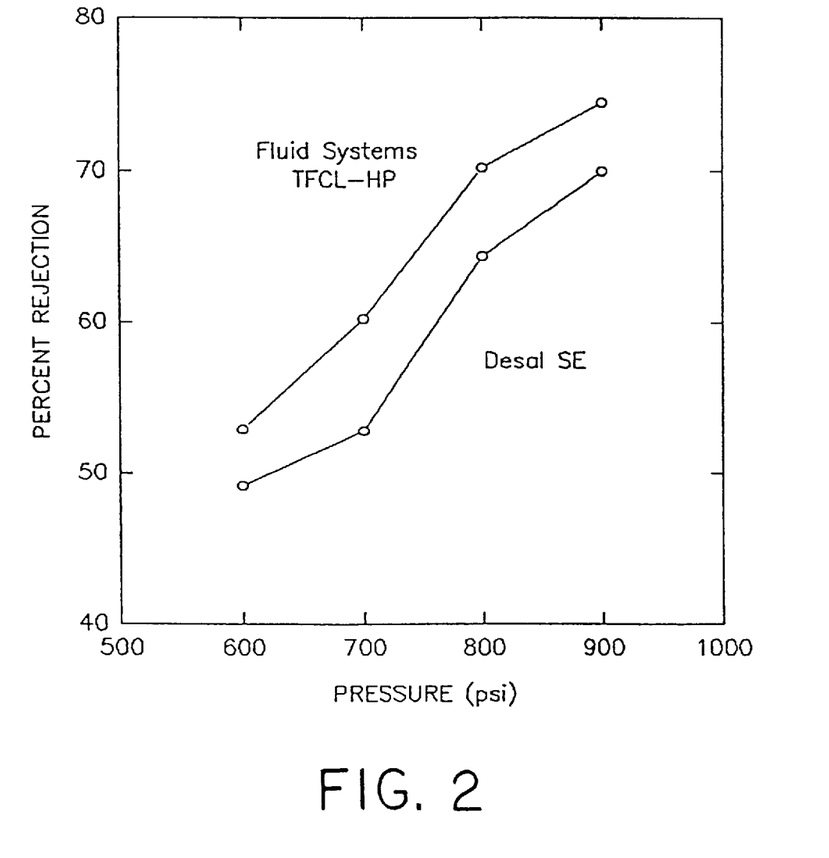
FIG. 2 is a graphical illustration reporting the relationship between percent rejection of hydroxylammonium nitrate and pressure in connection with Example 4.

The general procedure of Example 1 is repeated using a Fluid Systems TFCL-HP membrane and a Desalination Systems, Inc. SE membrane for comparative evaluations of percent rejection of hydroxylammonium nitrate at varying pressure. FIG. 2 reports the results of the evaluation.

EXAMPLE 5

Figure 3:
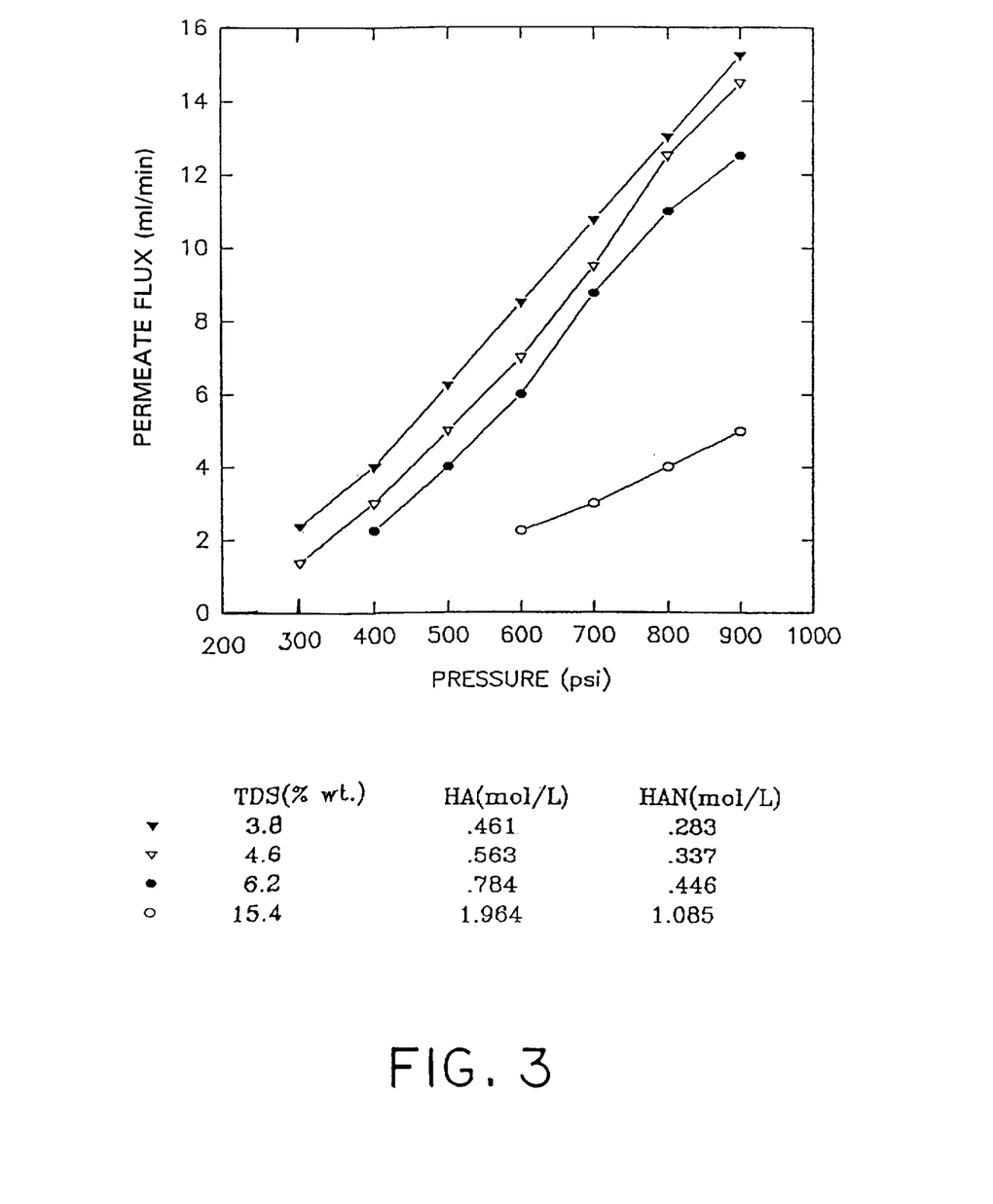
FIG. 3 is a graphical illustration reporting the relationship between permeate flux and pressure in connection with Example 5.
Figure 4:
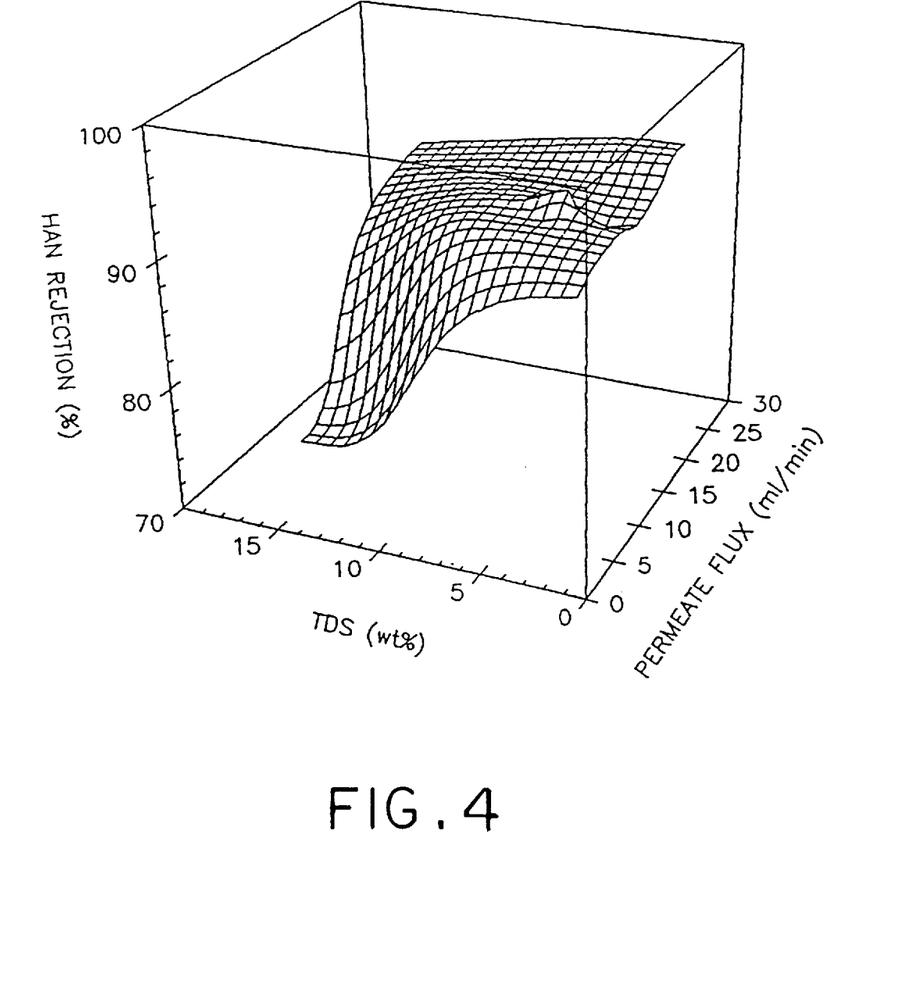
FIG. 4 is a three dimensional graphical illustration representing the relationship between percent rejection of hydroxylammonium nitrate, permeate flux and total dissolved salts in connection with Example 5.

Four feed solutions are pumped across a Fluid Systems TFCL-HP membrane to evaluate permeate flux verses pressure at various feed concentrations for total dissolved salts (TDS). FIGS. 3 and 4 report the results of the evaluation. The first solution contains about 0.461M of hydroxylamine and 0.283M of hydroxylammonium nitrate (represented by the solid triangle) containing 3.8% weight of total dissolved salts. The second solution contains about 0.563M of hydroxylamine and 0.337M of hydroxylammonium nitrate (represented by the hollow triangle) containing 4.6% weight of total dissolved salts. The third solution contains about 0.784M of hydroxylamine and 0.446M of hydroxylammonium nitrate (represented by the solid circle) containing 4.2% weight of total dissolved salts. The fourth solution contains about 1.964M of hydroxylamine and 1.085M of hydroxylammonium nitrate (represented by the hollow circle) containing 15.4% weight of total dissolved salts.

EXAMPLE 6

Figure 5:
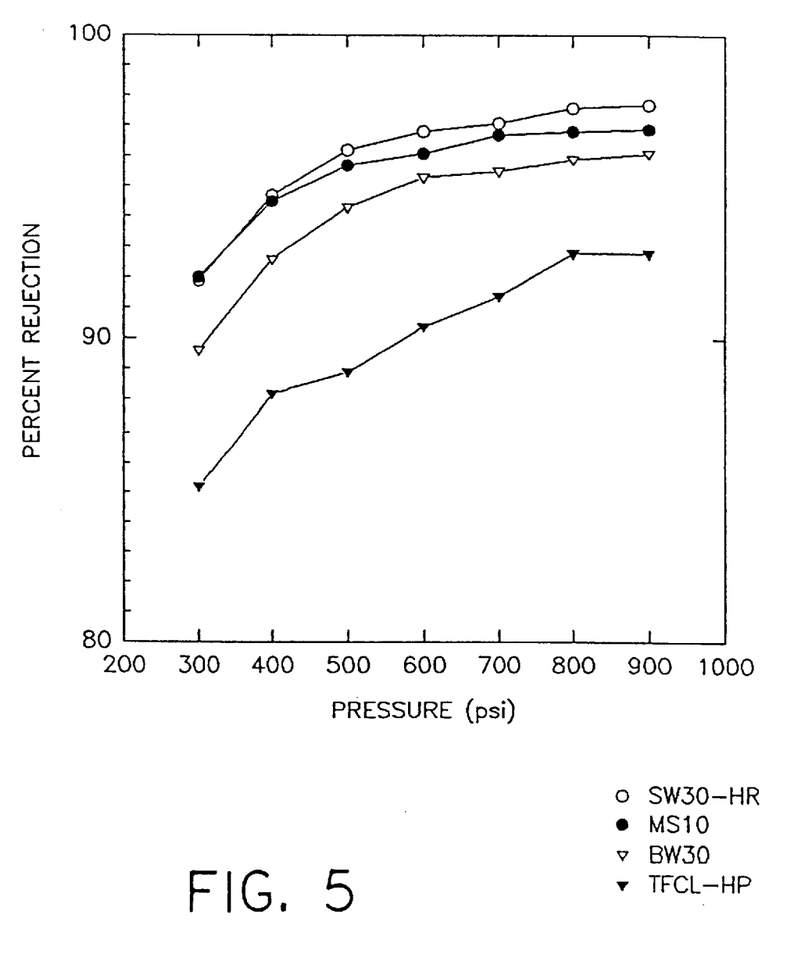
FIG. 5 is a graphical illustration reporting the relationship between percent rejection of hydroxylammonium nitrate and pressure in connection with Example 6.
Figure 6:
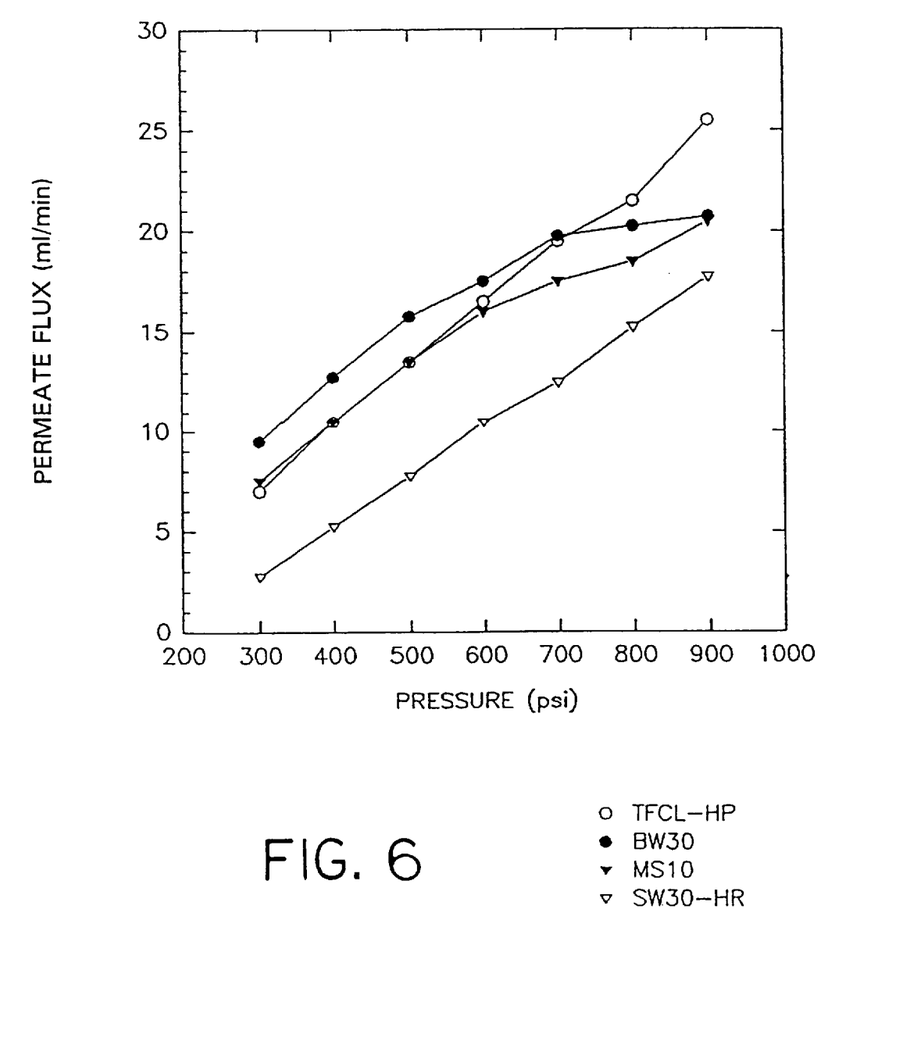
FIG. 6 is a graphical illustration reporting the relationship between permeate flux and pressure in connection with Example 6.

The general procedure of Example 1 is repeated except that the portion of the solution from the first pass than contacted with three additional membranes namely, FilmTec, SW-30R (represented by a hollow triangle), FilmTec BW30 (represented by a solid circle) and Osmonics MS10 (represented by a solid triangle) (the Fluid Systems TFCL-HP is represented by a hollow circle). The results of the evaluation are reported in FIGS. 5 and 6.

EXAMPLE 7

A solution of 1.0M of hydroxylamine and 0.5M of hydroxylammonium sulfate is contacted with a Fluid Systems TFCL-HP membrane having a surface area of 12.6 square inches under pressure of 800 psi in a single stainless steel cell. The permeate flux is 12.5 ml/min/12.6 in$^2$ membrane surface area. The portion of the solution passing through the membrane contains about 96% of the hydroxylamine and 7% of the hydroxylammonium sulfate present in the initial solution.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of purifying a hydroxylamine solution containing hydroxylamine and impurities, comprising:
   contacting the hydroxylamine solution with a semipermeable membrane under pressure so that at least a portion of the hydroxylamine solution passes through the membrane; and
   recovering the portion of the hydroxylamine solution which passed through the membrane.

2. The method of claim 1, wherein the impurities comprise a hydroxylammonium salt.

3. The method of claim 2, wherein the recovered portion of the hydroxylamine solution contains a lower concentration of hydroxylammonium salt than the hydroxylamine solution contacted with the semipermeable membrane.

4. The method of claim 1, wherein a reverse osmosis unit comprises the semipermeable membrane.

5. The method of claim 1, wherein the pressure is at least 300 psi.

6. The method of claim 1, further comprising repeating the method with the recovered portion of the hydroxylamine solution which passed through the membrane.

7. The method of claim 1, wherein the semipermeable membrane is a size selective semipermeable membrane.

8. The method of claim 1, wherein the recovered portion of the hydroxylamine solution contains less impurities than the hydroxylamine solution prior to contact with the semipermeable membrane.

9. A method of separating hydroxylamine from hydroxylammonium salt in a solution comprising hydroxylamine, at least one stabilizer and a hydroxylammonium salt, comprising:
   passing at least a portion of the solution comprising hydroxylamine, at least one stabilizer and the hydroxylammonium salt at a first concentration through a semipermeable membrane under pressure; and
   collecting the portion of solution which passed through the membrane, the portion comprising hydroxylamine, at least one stabilizer and the hydroxylammonium salt at a second concentration, wherein the second concentration is less than the first concentration.

10. The method of claim 9, wherein a reverse osmosis unit comprises the semipermeable membrane.

11. The method of claim 9, wherein the pressure is at least 300 psi.

12. The method of claim 9, wherein the semipermeable membrane is a size selective semipermeable membrane.

13. The method of claim 9, further comprising repeating the method with the recovered portion of the solution which passed through the membrane.

14. The method of claim 9, wherein the hydroxylammonium salt is at least one selected from the group consisting of hydroxylammonium nitrate, hydroxylammonium sulfate, hydroxylammonium phosphate and hydroxylammonium chloride.

15. The method of claim 9, wherein the hydroxylammonium salt is at least one selected from the group consisting of a methylhydroxylammonium salt, an ethylhydroxylammonium salt, a propyhydroxylammonium salt, an isopropylhydroxylammonium salt, and a diethylhydroxylammonium salt.

16. A method of purifying a hydroxylamine solution containing impurities, comprising:
   contacting the hydroxylamine solution with a semipermeable membrane under pressure so that at least a portion of the hydroxylamine solution passes through the membrane; and
   recovering the portion of the hydroxylamine solution which passed through the membrane, wherein the recovered portion of the hydroxylamine solution contains less impurities than the hydroxylamine solution prior to contact with the semipermeable membrane.

17. The method of claim 16, wherein the impurities comprise a hydroxylammonium salt.

18. The method of claim 17, wherein the recovered portion of the hydroxylamine solution contains a lower concentration of hydroxylammonium salt than the hydroxylamine solution contacted with the semipermeable membrane.

19. The method of claim 16, wherein a reverse osmosis unit comprises the semipermeable membrane.

20. The method of claim 16, wherein the pressure is at least 300 psi.

21. The method of claim 16, further comprising repeating the method with the recovered portion of the hydroxylamine solution which passed through the membrane.

22. The method of claim 16, wherein the semipermeable membrane is a size selective semipermeable membrane.

23. The method of claim 16, wherein the hydroxylamine solution further contains a stabilizer.

* * * * *